(12) United States Patent
McGowan (10) Patent No.: US 11,724,175 B2
(45) Date of Patent: Aug. 15, 2023

(54) SWING SCOOTER WITH MOVABLE FOOT PLATFORMS

(71) Applicant: Yvolve Sports Limited, Dublin (IE)

(72) Inventor: John McGowan, Balbriggan (IE)

(73) Assignee: YVOLVE SPORTS LIMITED, Dublin (IE)

( * ) Notice: Subject to any disclaimer, the term of this patent is extended or adjusted under 35 U.S.C. 154(b) by 47 days.

(21) Appl. No.: 17/351,743

(22) Filed: Jun. 18, 2021

(65) Prior Publication Data

US 2022/0401820 A1 Dec. 22, 2022

(51) Int. Cl.
| | | |
|---|---|---|
| *B62M 1/00* | (2010.01) | |
| *A63C 17/26* | (2006.01) | |
| *B62K 3/00* | (2006.01) | |
| *B62M 1/20* | (2006.01) | |
| *A63C 17/00* | (2006.01) | |

(52) U.S. Cl.
CPC .......... *A63C 17/265* (2013.01); *A63C 17/004* (2013.01); *B62K 3/002* (2013.01); *B62M 1/20* (2013.01)

(58) Field of Classification Search
CPC ... A63C 17/265; A63C 17/004; A63C 17/006; A63C 17/066; B62K 3/002
See application file for complete search history.

(56) References Cited

U.S. PATENT DOCUMENTS

| | | | | |
|---|---|---|---|---|
| 3,856,321 A | * | 12/1974 | Solymosi | A63C 17/004 280/842 |
| 4,087,106 A | * | 5/1978 | Winchell | B62B 13/12 280/14.28 |
| 4,120,508 A | * | 10/1978 | Brown | A63C 17/0086 280/11.28 |
| 4,120,510 A | * | 10/1978 | Hillard | A63C 17/015 280/11.28 |
| 4,336,952 A | * | 6/1982 | Rochman | A63C 17/0026 280/87.1 |
| 4,744,576 A | * | 5/1988 | Scollan, Jr. | A63C 17/015 280/11.211 |
| 6,286,843 B1 | * | 9/2001 | Lin | A63C 17/014 280/11.28 |

(Continued)

FOREIGN PATENT DOCUMENTS

| | | |
|---|---|---|
| CN | 201321133 Y | 10/2009 |
| CN | 201484601 U | 5/2010 |

(Continued)

*Primary Examiner* — Steve Clemmons
(74) *Attorney, Agent, or Firm* — Aird & McBurney LP (57) ABSTRACT

In an aspect there is provided a swing scooter, comprising a frame, a steering member, a front wheel, at least two support legs, and at least two platforms. A rear wheel support is pivotally attached each support leg. A rear wheel is rotatably attached to each rear wheel support. Each platform is movably attached to an associated support leg, and positioned for supporting a foot of a user. Each platform has a longitudinal platform axis and is movable between a first position in which the platform is angled down laterally towards a first lateral side of the swing scooter, and a second position in which the platform is angled down laterally towards a second lateral side of the swing scooter. The platform is movable to the first and second positions by movement of the foot of the user.

13 Claims, 10 Drawing Sheets

(56) References Cited

U.S. PATENT DOCUMENTS

| | | | |
|---|---|---|---|
| 6,991,242 B2 | 1/2006 | Teng et al. | |
| 7,083,178 B2 * | 8/2006 | Potter | A63C 17/223 |
| | | | 280/87.05 |
| 7,192,038 B2 * | 3/2007 | Tsai | B62K 3/002 |
| | | | 280/87.041 |
| 7,549,655 B2 | 6/2009 | Fan | |
| 7,597,334 B2 * | 10/2009 | Chen | B62K 5/02 |
| | | | 280/87.01 |
| 7,926,825 B2 | 4/2011 | Chen | |
| 8,505,935 B2 | 8/2013 | Kim et al. | |
| 8,807,581 B2 * | 8/2014 | Liao | B62K 15/00 |
| | | | 280/87.041 |
| 9,266,582 B2 * | 2/2016 | Calabria | A63C 17/015 |
| 9,387,900 B2 | 7/2016 | Chen | |
| 9,656,709 B2 * | 5/2017 | O'Connell | A63C 17/265 |
| 9,889,368 B1 * | 2/2018 | Chen | A63C 17/045 |
| 9,908,032 B2 * | 3/2018 | Garcia Elena | A63C 17/015 |
| 10,238,952 B2 * | 3/2019 | Clos | A63C 17/012 |
| 10,486,733 B2 | 11/2019 | Moujoud | |
| 2011/0298193 A1 | 12/2011 | Fan | |
| 2012/0126523 A1 * | 5/2012 | Langer | A63C 17/045 |
| | | | 280/842 |
| 2015/0054252 A1 * | 2/2015 | Lee | B62K 21/06 |
| | | | 280/276 |
| 2017/0088224 A1 | 3/2017 | Baron et al. | |
| 2019/0127010 A1 | 5/2019 | Jiang et al. | |

FOREIGN PATENT DOCUMENTS

| | | | |
|---|---|---|---|
| CN | 203427957 U | | 2/2014 |
| CN | 203832661 U | | 9/2014 |
| CN | 204507118 U | | 7/2015 |
| CN | 205440700 | | 8/2016 |
| CN | 106143750 A | * | 11/2016 |
| EP | 1950126 B1 | | 8/2009 |
| KR | 20160003558 U | * | 10/2016 |

* cited by examiner

SWING SCOOTER WITH MOVABLE FOOT PLATFORMS

FIELD

This disclosure relates generally to swing scooters, also known as wiggle scooters, and more particularly to foot support platforms for swing scooters.

BACKGROUND OF THE DISCLOSURE

A swing scooter, when on a generally horizontal surface in its operating configuration, will generally include a handlebar attached to a front bar that is generally vertically disposed with respect to the surface and that has attached to a bottom end a front wheel steerable by rotation of the handlebar. The front, generally vertically disposed bar is rotatably held, above the front wheel, within a main body, to which is attached two lower bars extending rearwardly at an angle to one another. A rear wheel is pivotally attached at a rear end of each of the two lower bars by way of an angled connection so as to produce a positive caster. A foot plate is attached to each lower bar, to support a user's feet.

A user of the swing scooter is able to propel the scooter forward by applying a force through their feet, on both foot plates, in alternating directions (i.e., by angling their feet first to one side and applying a force on the foot plates outward to a side (e.g., toward the right) and then to the other side (e.g., toward the left), and repeating the side to side application of force on the foot plates/lower bars, resulting in forward propulsion of the swing scooter as the rear wheels move forward over the surface in an S-shaped path.

Foot plates of existing swing scooters are fixed in a horizontal plane (when viewing the swing scooter, placed on a horizontal surface, from front to rear). As such, when a user's feet apply force against the foot plates toward the right or left side, as the user swings their body from side to side, the angling of the user's feet results in loss of contact between a portion of the user's feet and the foot plates, or at least a lessening of the force applied to the foot plates, which in turn results in a loss in efficiency in the transfer of force to the foot plates and, in turn, in the forward propulsion.

Furthermore, the above-described fixed horizontal arrangement of the foot plates of existing swing scooters presents an ergonomic problem: as a user swings their body side to side in order to propel the swing scooter forward, and attempts to maintain the soles of their feet in the horizontal position in order to attempt to maintain contact with the foot plates as best as possible despite the side to side movement of their feet, the user's ankles may become strained.

SUMMARY OF THE DISCLOSURE

In an aspect there is provided a swing scooter, comprising a frame defining a longitudinal scooter axis, a steering member pivotally attached to the frame, a front wheel rotatably attached to a bottom end of the steering member, such that pivoting of the steering member causes the front wheel to pivot so as to steer the swing scooter, at least two support legs, and at least two platforms. Each of the at least two support legs having a frame attachment end and a rear wheel end, and each of said at least two support legs being attached to the frame at the frame attachment end. At the rear wheel end of each of said at least two support legs, there is a rear wheel support pivotally attached thereto. A rear wheel is rotatably attached to each rear wheel support. Each of the at least two platforms is movably attached to an associated one of the at least two support legs, and positioned for supporting a foot of a user of the swing scooter. Each of the at least two platforms has a longitudinal platform axis and is movable between a first position in which the platform is angled down laterally towards a first lateral side of the swing scooter, and a second position in which the platform is angled down laterally towards a second lateral side of the swing scooter. The platform is movable to the first position and the second position by movement of the foot of the user.

Other technical advantages may become readily apparent to one of ordinary skill in the art after review of the following figures and description.

BRIEF DESCRIPTIONS OF THE DRAWINGS

For a better understanding of the various embodiments described herein and to show more clearly how they may be carried into effect, reference will now be made, by way of example only, to the accompanying drawings in which.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The indefinite article "a" is intended to not be limited to meaning "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Directional terms used herein, such as "front", "forward", "back", "rear", "rearward", "side", "right", "left", "top", "bottom", "under", "atop", "below", "over", and other related or like terms are used to convey relative positions of the described components with respect to one another and are otherwise not intended to limit the described embodiments.

Well-known methods, procedures and components have not been described herein in detail so as not to obscure the example embodiments described herein. Also, persons of skill in the art will appreciate that there are alternative implementations and modifications, beyond those of the example embodiments described herein, that are possible, and that the described embodiments are only for illustration of one or more example implementations. The description, therefore, is not to be considered as limiting scope, which is only limited by the claims appended hereto.

With reference to FIGS. 1-8, a swing scooter 10 is shown and comprises a frame 12 defining a longitudinal scooter axis As. The longitudinal scooter axis As is also the direction of travel of the swing scooter 10 when travelling directly forward on its wheels shown at 22 and 24. The frame 12 may comprise a main body 11 and a neck member 18. A steering member 14 is pivotally attached to the frame 12. In the embodiment shown, the neck member 18 may be secured to the main body 11 and rotatably secures the steering member 14 therein, for rotation about a steering axis Asm of the steering member 14. As such, the neck member 18 has longitudinally passing therethrough a passage for rotatable receipt of the steering member 14, and where the neck member 18 is positioned such that the passage is partially or completely disposed overtop the main body 11, the main body 11 may also comprise a passage for rotatable receipt of the steering member 14 therethrough.

Figure 1:
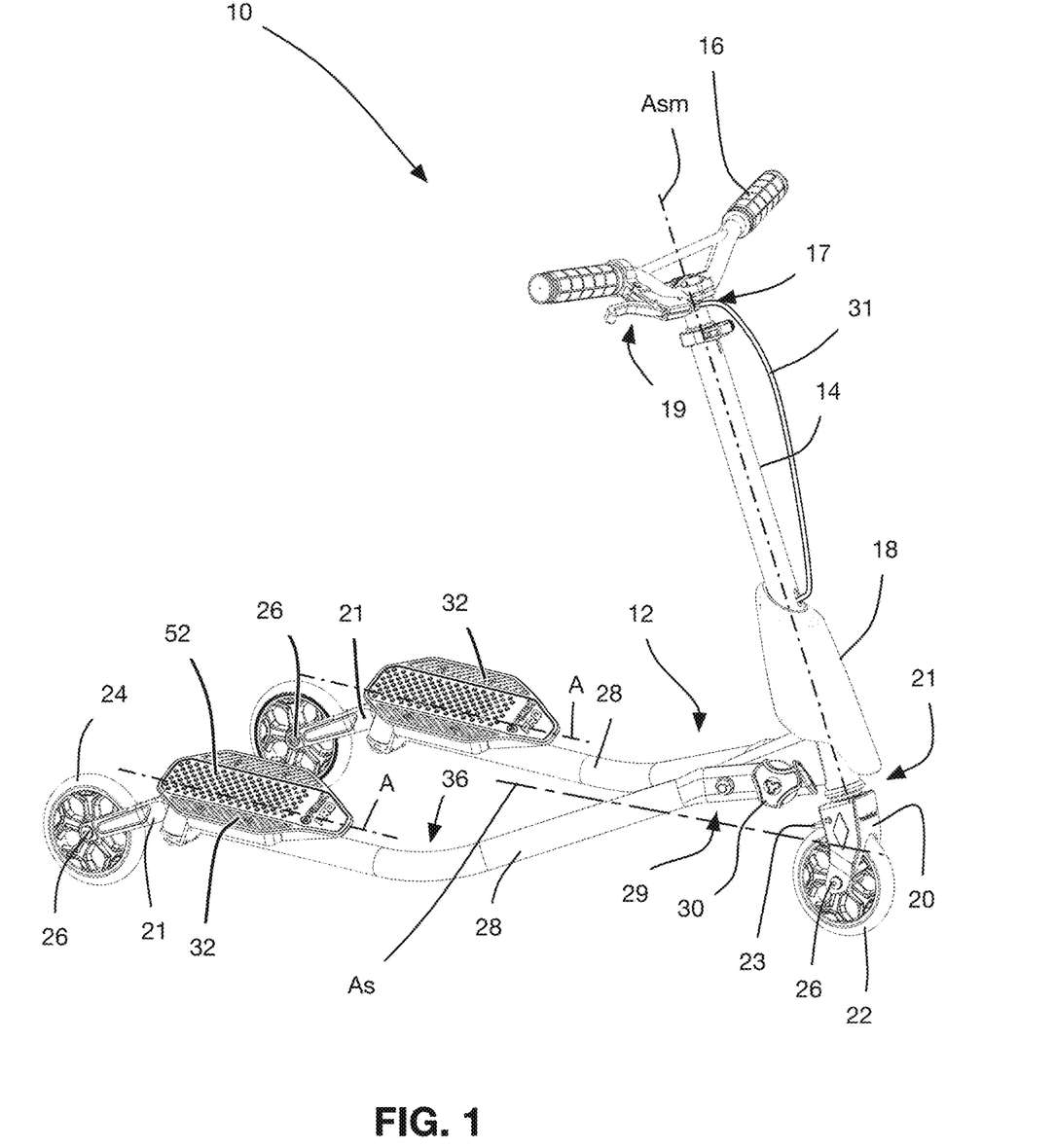
FIG. 1 is a top-right perspective view of an example swing scooter showing platforms in a pivoted arrangement, according to non-limiting embodiments.

In the embodiment shown, the steering member 14 is telescopic, and includes a first, outer portion 14*a*, and a second, inner portion 14*b* that can be extended or retracted relative to the first, outer portion 14*a*, and secured via a cam-lock clamp, shown at 15.

The swing scooter 10 may further comprise a handlebar 16 attached to a top end 17 of the steering member 14 (e.g. to a top end of the second, inner portion 14*b*) and which is pivotable with the steering member 14.

A front wheel 22 may be rotatably attached to a bottom end 20 of the steering member 14, such as by a front fork 20 and an axle 26 passing through a center of the front wheel 22 and held at ends of the axle 26 by the front fork 20, so as to permit rotation of front wheel 22 on the ground or some other support surface. The front wheel 22 may be attached such that pivoting of the steering member 14 (e.g. by pivoting of the handlebar 16) about the steering axis Asm of the steering member 14 causes the front wheel 22 to pivot in a steering direction.

The handlebar 16 may comprise one or more brake actuators 19 which may connect to a brake 23 (shown more clearly in FIGS. 3 and 4) capable of applying a braking force to one or more of the front and rear wheels 22, 24 for slowing or stopping rotation of at least one of the wheels 22 and 24. The brake 23 may include any suitable components such as a pivotable member that can pivot to a braking position wherein it frictionally engages the front wheel 22. A cable shown at 31, or any other suitable force transfer element may transfer the actuation of the brake actuator 19 to the brake 23.

Figure 4:
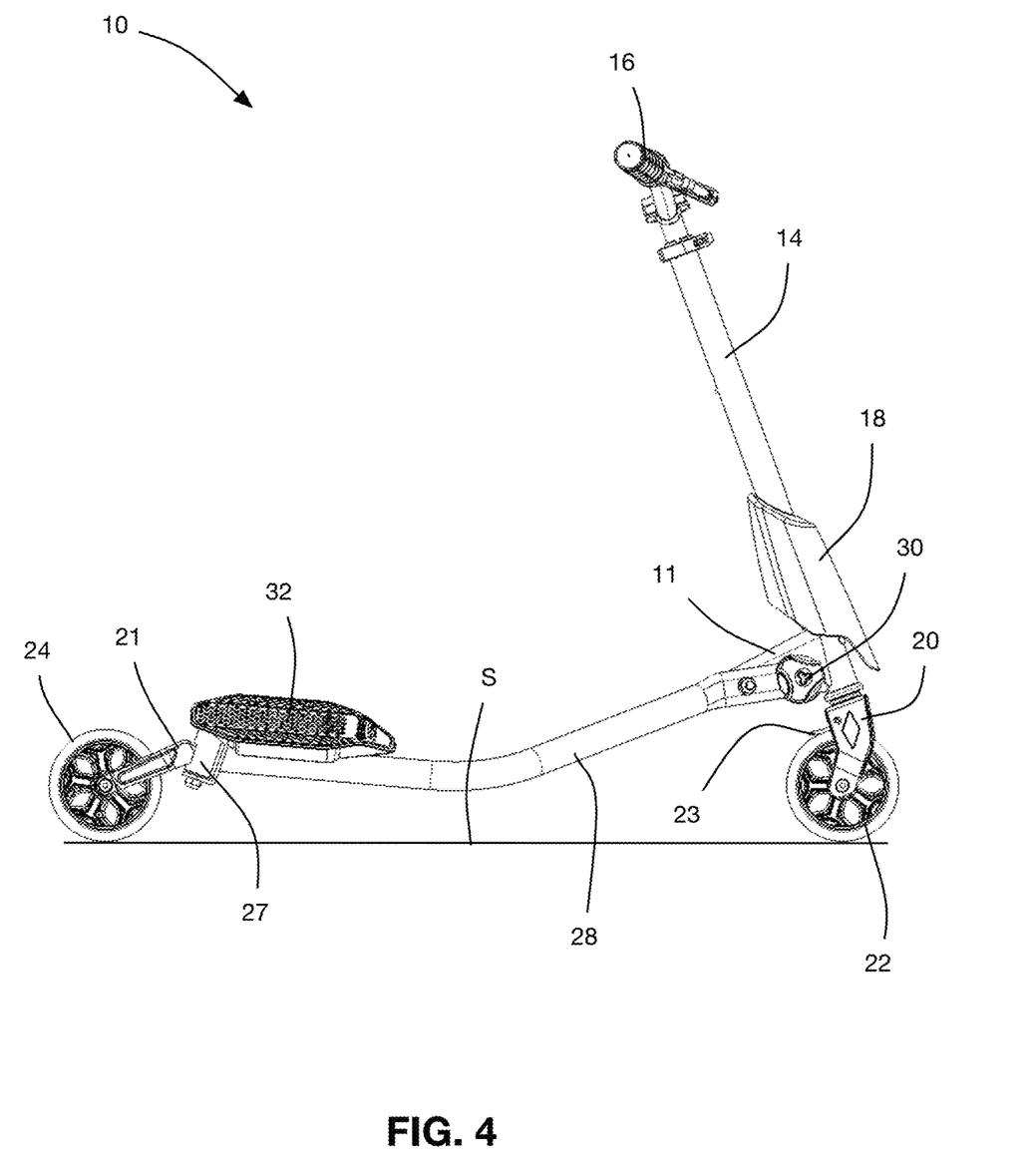
FIG. 4 is a right-side elevation view of the swing scooter depicted in FIG. 1.
Figure 5:
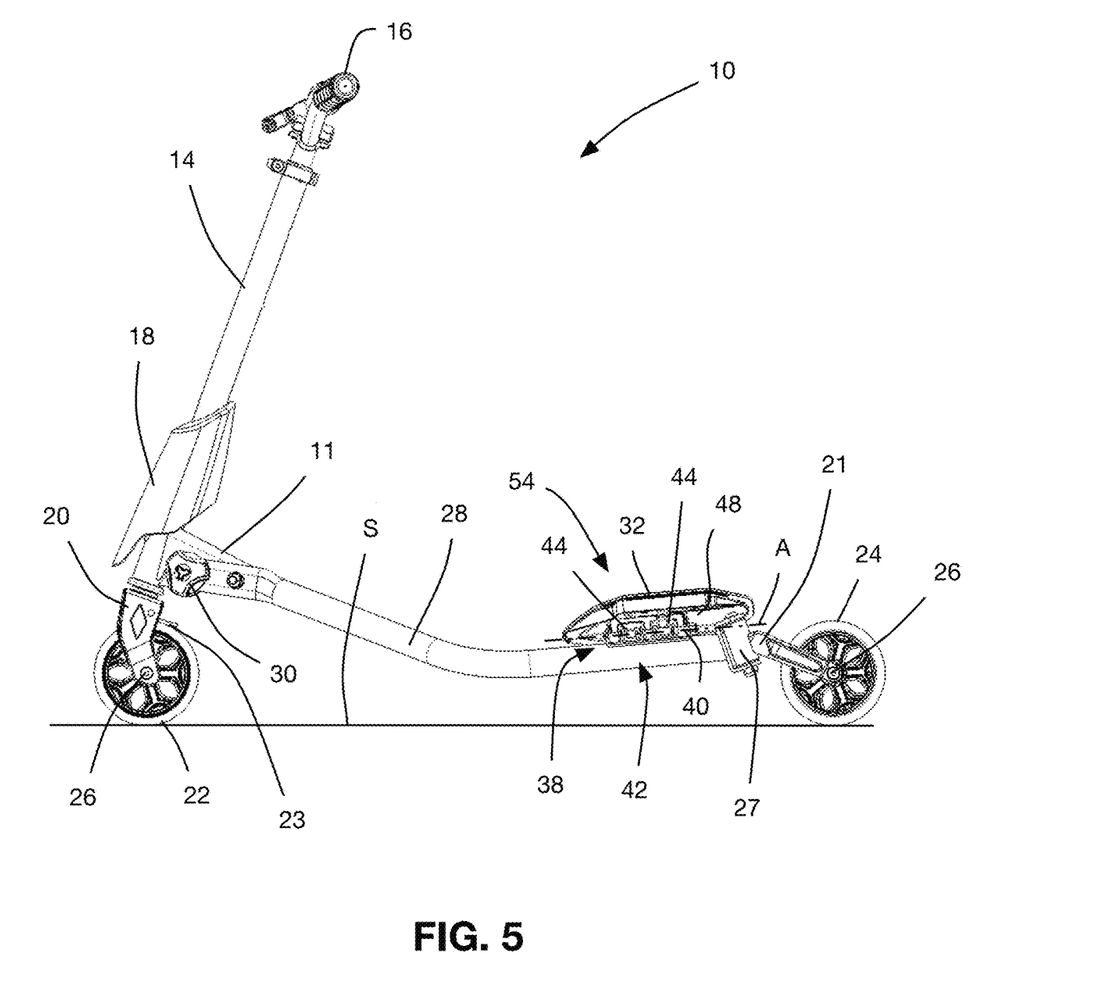
FIG. 5 is a left-side elevation view of the swing scooter depicted in FIG. 1.
Figure 6:
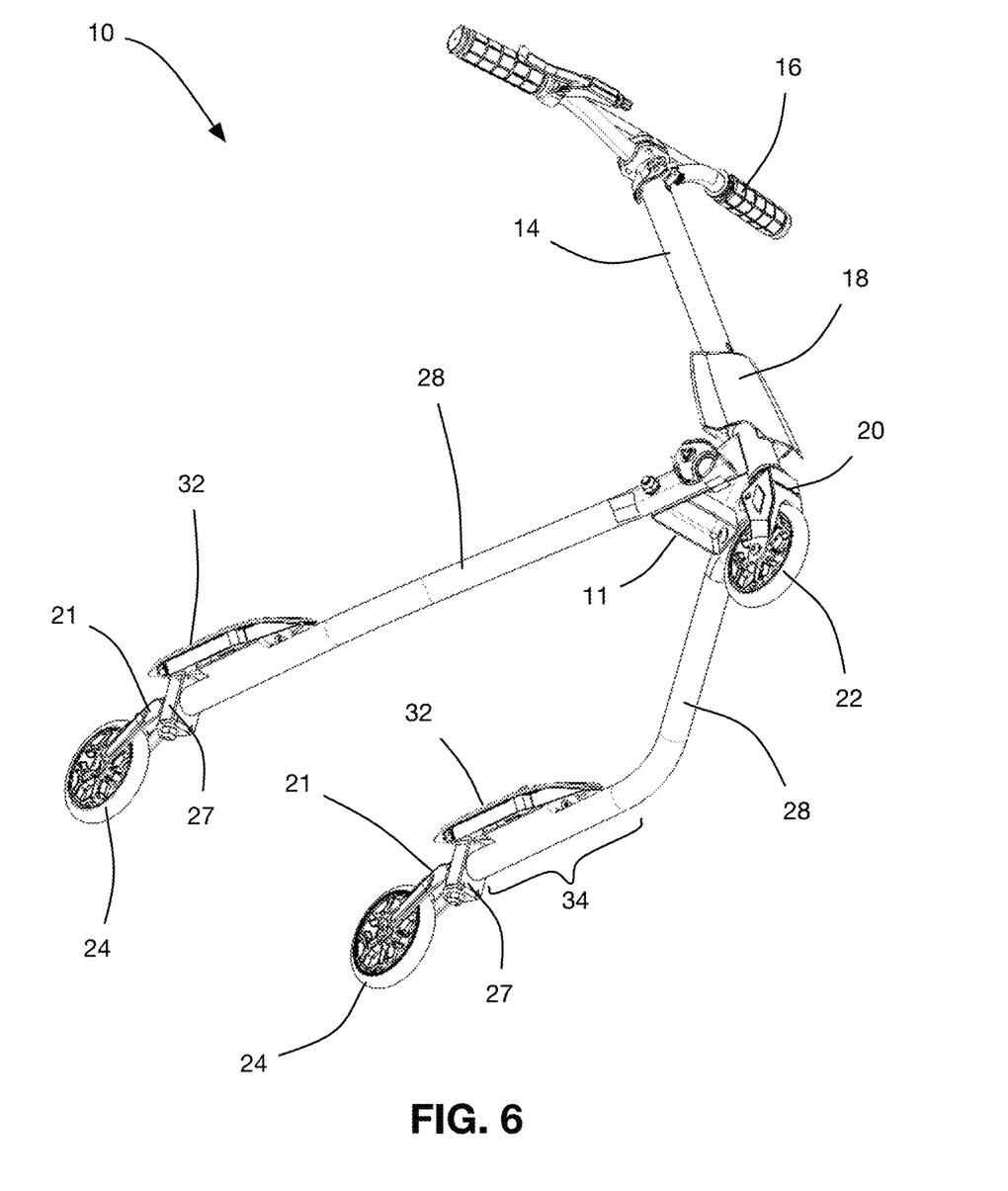
FIG. 6 is a lower-right perspective view of the swing scooter depicted in FIG. 1.

The swing scooter 10 may further comprise at least two support legs 28, which may be spaced apart from one another. Each support leg 28 has a frame attachment end 29 and a rear wheel end 25. Each support leg 28 may be attached to the frame 12 at the main body attachment end 29, and extends generally rearward from the frame 12, such that when the swing scooter 10 is in an operable configuration (i.e., as shown in FIGS. 1-8), the longitudinal axes of the support legs are generally orthogonal with respect to the steering axis Asm of the steering member 14 when the swing scooter is viewed from its side, as shown in FIGS. 4 and 5. The support legs 28 may be pivotable, at their attachments to the main body, inward toward one another, outward away from one another, and/or vertically with respect to horizontal surface S.

In some example embodiments, forward portion of swing scooter 10, comprising at least the handlebar 16, the steering member 14, the neck member 18, the front wheel 22, and their connecting components, may be foldable toward the support legs 28 to a storage configuration (not shown). Swing scooter 10 may be locked into the operable and storage configurations by locking mechanism 30, which may be loosened to permit folding of the swing scooter 10 into the storage configuration or unfolding of the swing scooter 10 into the operable configuration, and which may be tightened to lock the swing scooter 10 into the storage or operable configuration. It will be appreciated that locking mechanism 30 may comprise alternative locking and unlocking mechanisms as would be known in the art.

At the rear wheel end 25 of each of the at least two support legs 28, there is a rear wheel support 21 pivotally attached thereto. Swing scooter 10 may further comprise a rear wheel 24 rotatably attached to each rear wheel support 21. Each rear wheel support 21 may be a fork and may thus be referred to as a rear fork 21. The associated rear wheel 24 may be connected to the rear fork 21 by an axle 26 passing through a center of the rear wheel 24. The axle 26 may be held at ends thereof by the rear fork 21, so as to permit rotation of rear wheel 24. Each rear wheel support 21 may be pivotally attached to the rear wheel end 25 of one of the support legs 28 by way of an angled connection, that is oriented such that the angled rear forks 21 are provided with a negative caster.

Swing scooter 10 may further comprise at least two platforms 32, wherein each of at least two platforms is movably attached to an associated one of the at least two support legs 28, and positioned for supporting a foot 98 (represented as a shoe in FIG. 3) of a user 99 (represented as a stick figure in FIG. 3) of the swing scooter 10, (e.g. while propelling the swing scooter 10, or such as while standing at rest on the swing scooter 10).

Each of the at least two platforms 32 is movable between a first position (FIG. 1) in which the platform 32 is angled down laterally towards a first lateral side of the swing scooter 10, and a second position (FIG. 10) in which the platform 32 is angled down laterally towards a second lateral side of the swing scooter 10. Each platform 32 is movable to the first position and the second position by movement of the associated foot 98 of the user 99.

Each platform 32 may be pivotably attached atop a support leg 28, such that each platform 32 is pivotable about a longitudinal platform axis A. In other words, the pivotal attachment of each platform 32 permits each platform 32 to be angled with respect to a plane that is horizontal when viewing the swing scooter 10 placed on the support surface S, from front to rear, such as horizontal plane H shown in FIG. 8, or any plane parallel thereto. Longitudinal platform axis A may be parallel to or substantially parallel to the longitudinal scooter axis As. As a result, when a platform 32 is angled down laterally towards a first or second lateral side of the swing scooter 10 is also angled down laterally towards a first or second lateral side of the longitudinal platform axis A.

Figure 2:
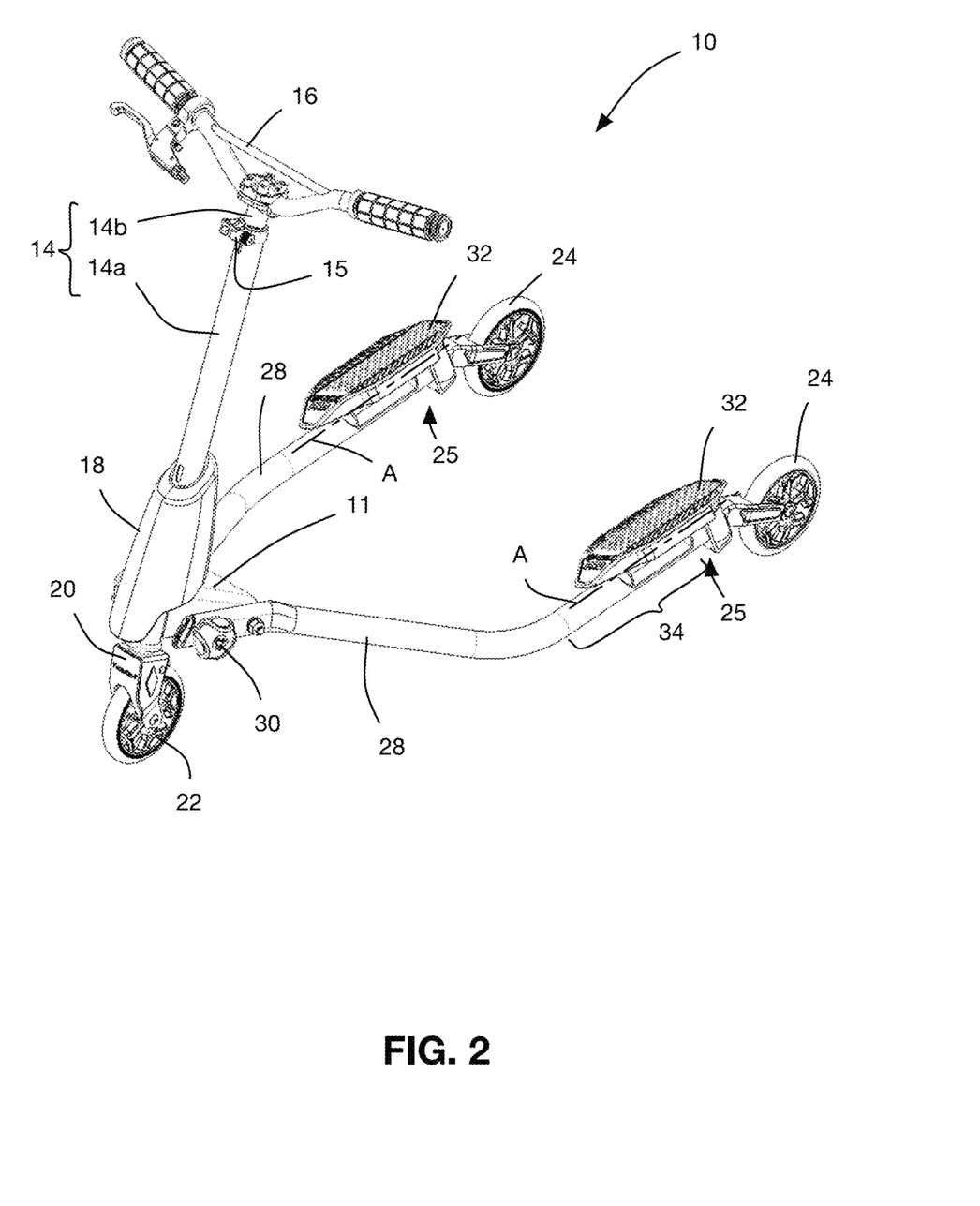
FIG. 2 is a top-left perspective view of the swing scooter depicted in FIG. 1.
Figure 3:
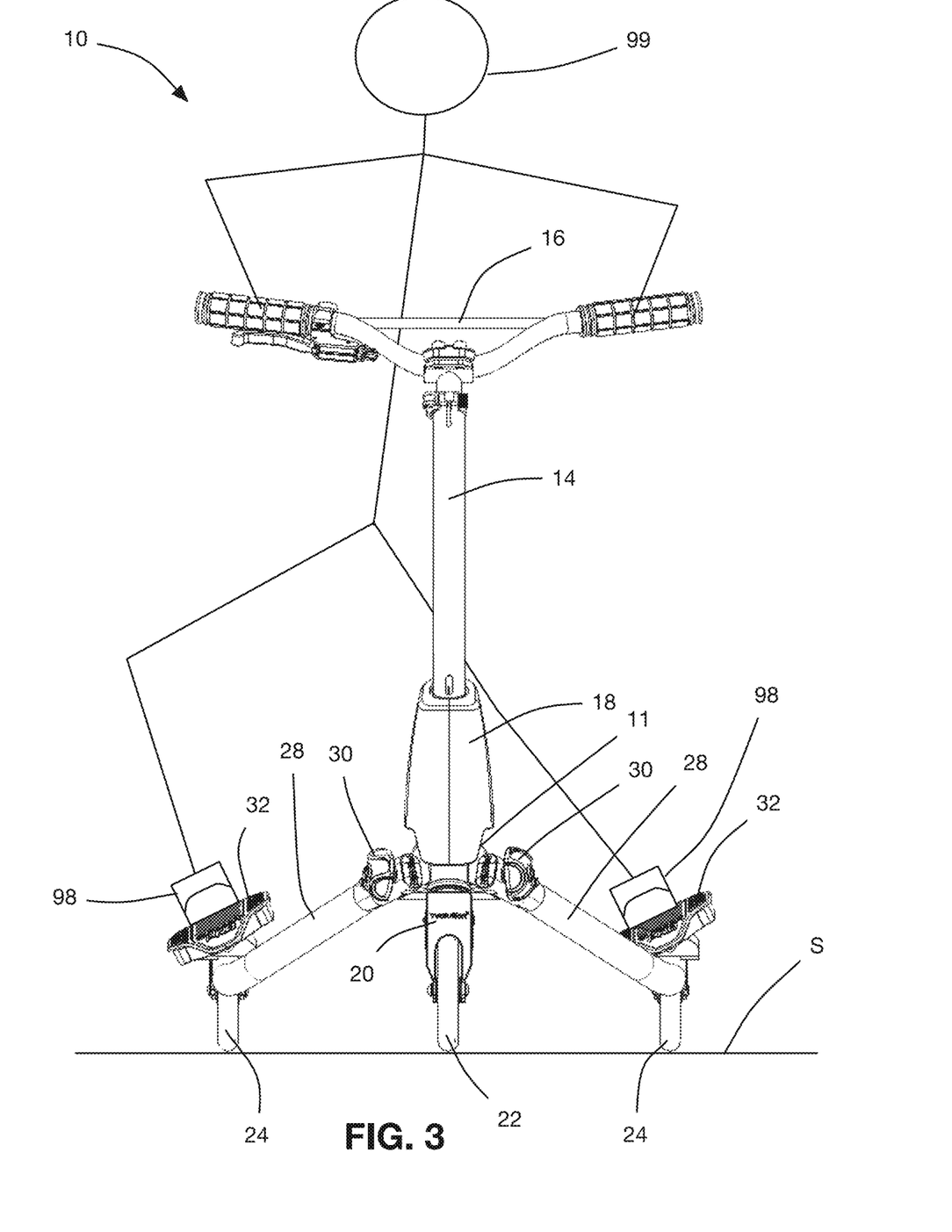
FIG. 3 is a front view of the swing scooter depicted in FIG. 1.

The longitudinal platform axis A may also be parallel to or substantially parallel to an axis of a portion 34 of the support leg 28 to which the platform 32 is pivotably attached, such as the rear portion 34 shown in FIG. 2. The portions 34 of the support legs 28 may be substantially parallel to each other (as shown in FIGS. 1-8, 11, and 12), in which case support legs 28, which diverge from the main body 11 at an angle to one another, may bend at bend 36 so as to extend rearward beyond bend 36 generally parallel to one another. In this way, where the portions 34 of the support legs 28 to which platforms 32 are pivotably attached comprise rear portions 32 (as shown in FIG. 2), the platforms 32 will be arranged in a generally parallel fashion with respect to one another so as to permit a user's feet 98, when placed atop the platforms 32, to be positioned in a more natural way, generally parallel to one another. In other embodiments, support legs 28 need not include the bend 36, so that they continue to diverge from one another as they extend rearward from the main body 11. In such embodiments, platforms 32, i.e. the longitudinal platform axes A, need not be parallel to each other or, alternatively, despite the divergence of the support legs 28, platforms 32 may be pivotably attached to support legs 28 by a mechanism that permits the platforms 32 to be parallel to one another.

Figure 10:
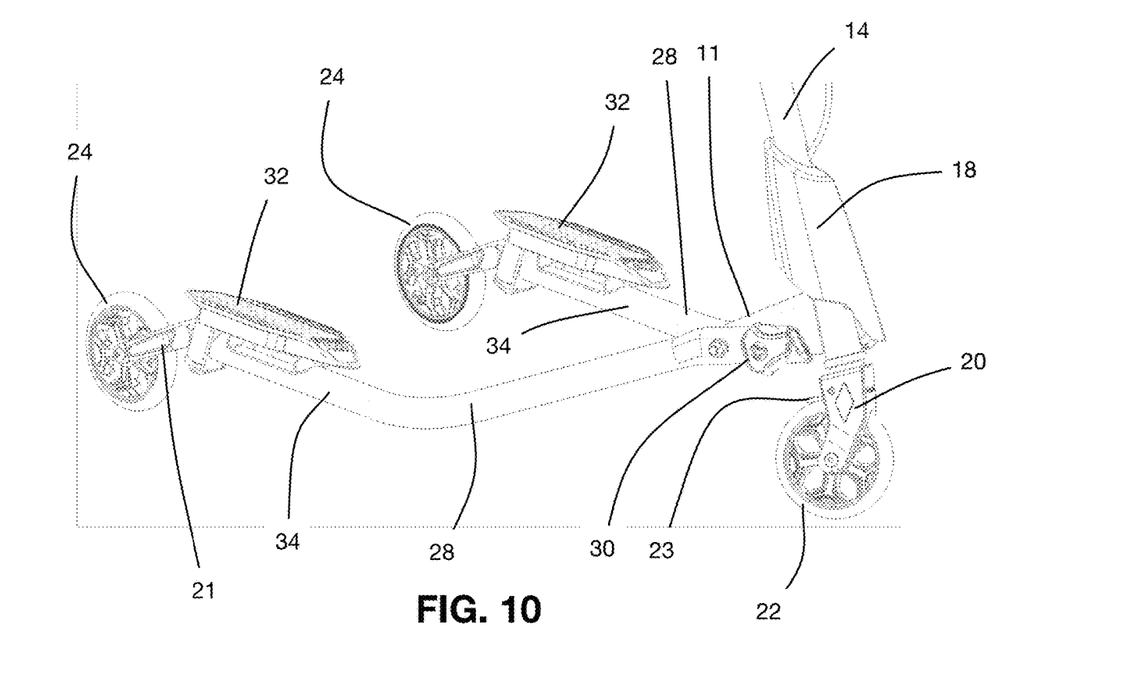
FIG. 10 is a perspective view of the swing scooter depicted in FIG. 1 illustrating steering of the swing scooter.

The user 99 of the swing scooter 10 may propel the swing scooter 10 forward by applying a force through their feet 98 against the platforms 32, in alternating lateral directions (i.e., by angling their feet first to one side and applying a force on the platforms 32 toward a side (e.g., by pushing with their feet 98 toward their right as shown in FIG. 1) and then toward the other side (e.g., by pushing with their feet 98 toward their left as shown (albeit without the user) in FIG. 10), and repeating the alternating side to side application of force on the platforms 32 and thus on the support legs 28, resulting in forward propulsion of the swing scooter 10 as the rear wheels 24 move forward over the surface S (shown in FIGS. 3 and 8) in a serpentine path. Since the platforms 32 of swing scooter 10 are not fixed in position on the respective support legs 28, when the foot 98 of a user 99 is angled by the user 99 about the longitudinal platform axis A, while in contact with the platform 32, the respective platform 32 pivots so as to be similarly angled.

Figure 7:
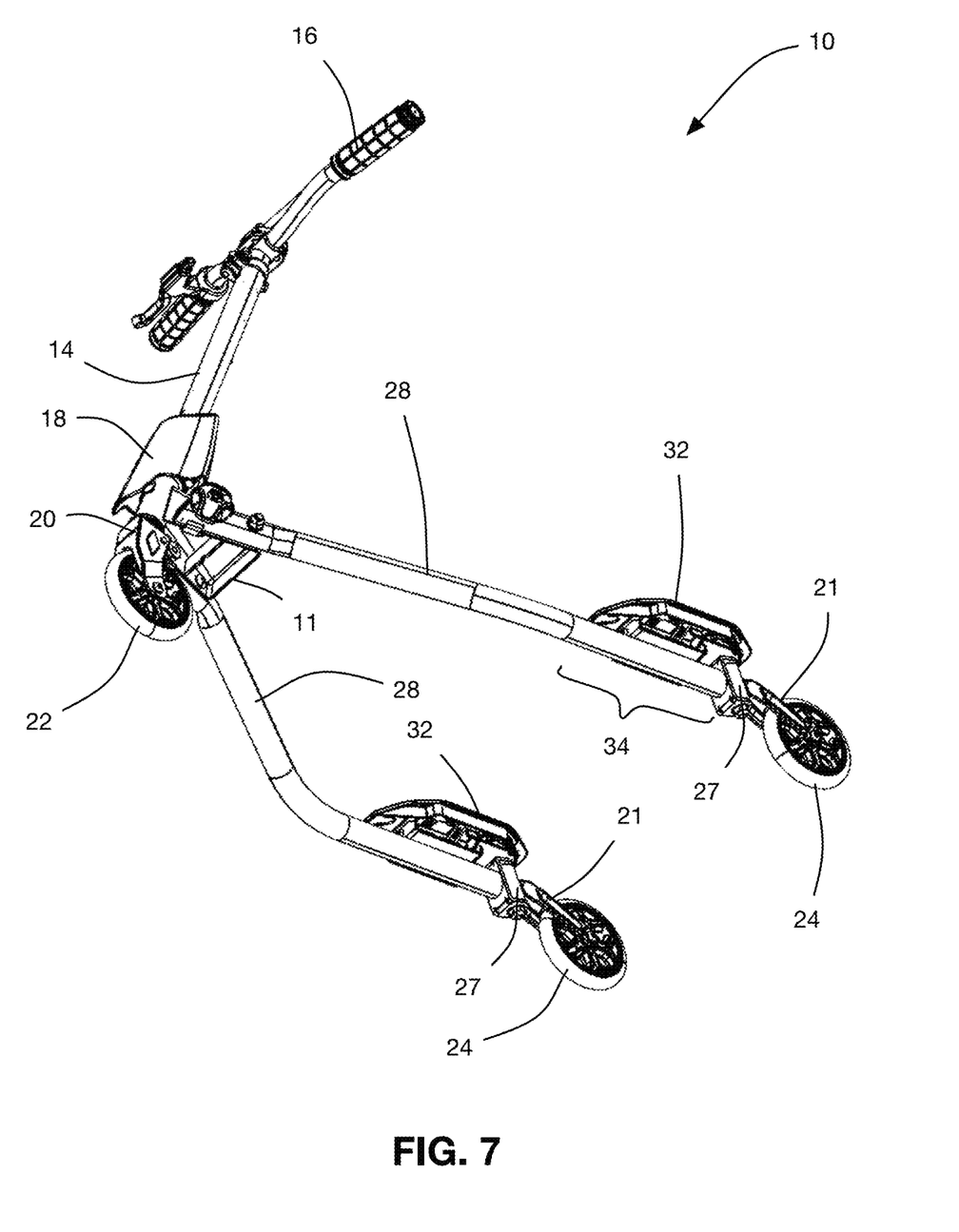
FIG. 7 is a lower-left perspective view of the swing scooter depicted in FIG. 1, showing the platforms in a non-pivoted arrangement.
Figure 8:
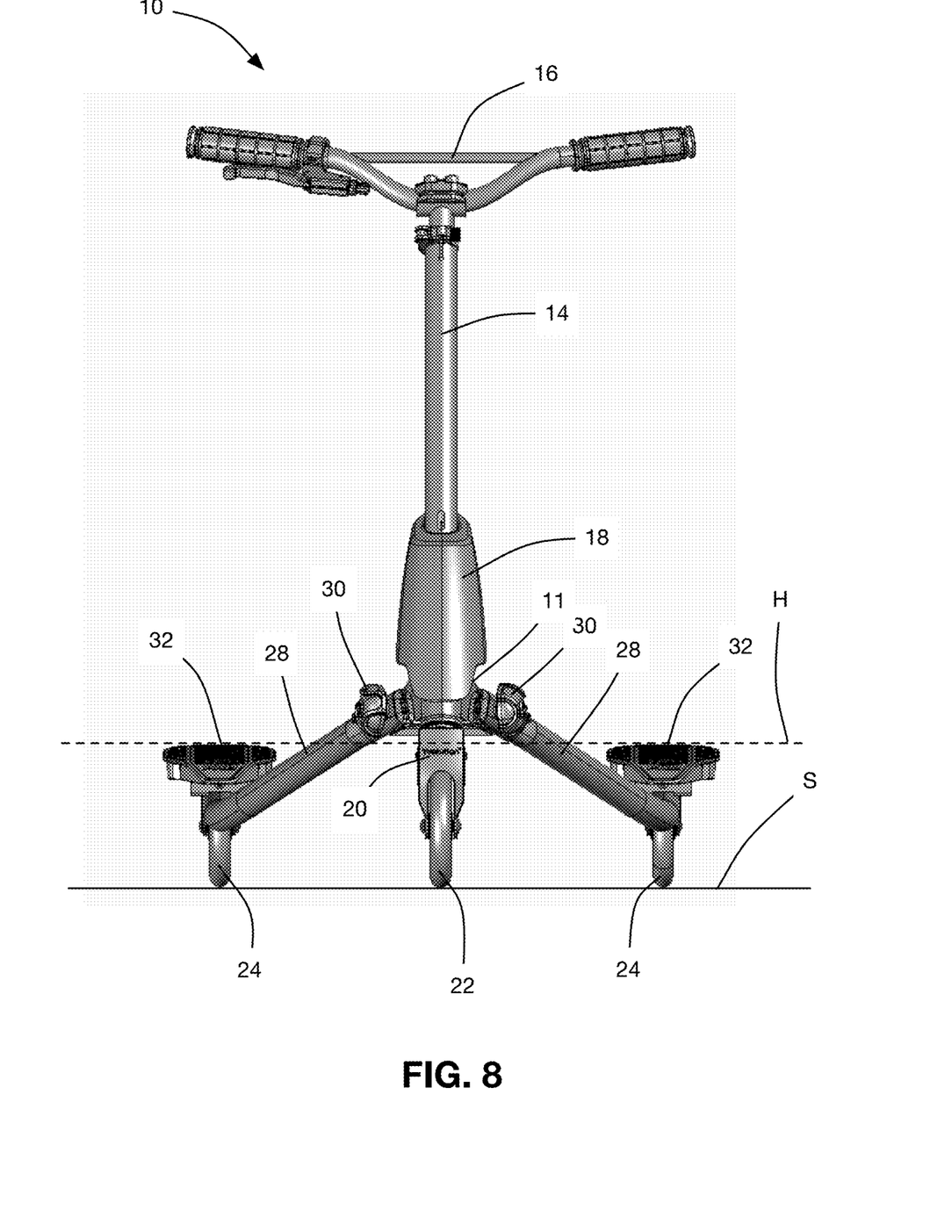
FIG. 8 is a front view of the swing scooter depicted in FIG. 7.
Figure 9:
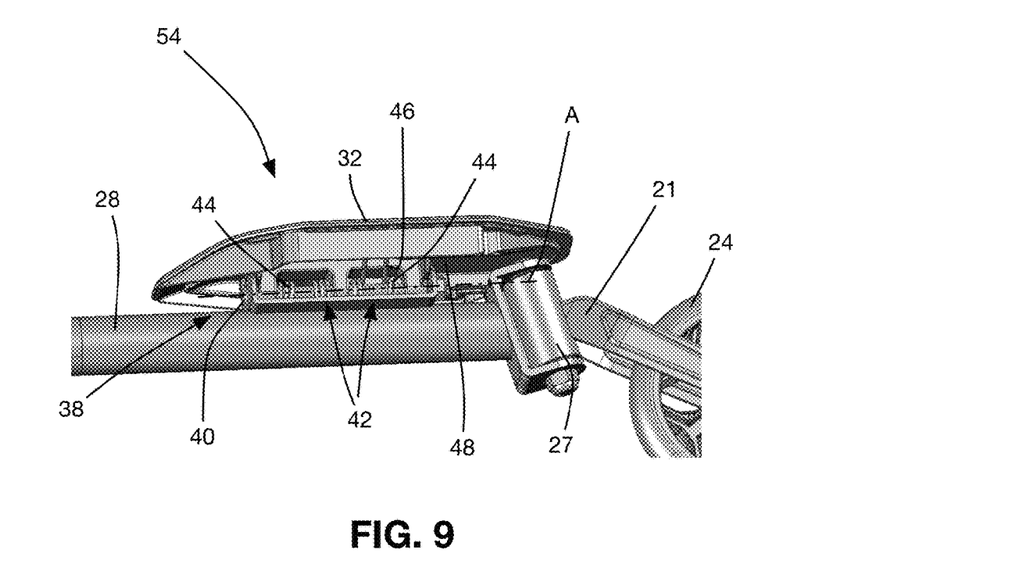
FIG. 9 is an exploded view of an example platform assembly according to non-limiting embodiments.

In some embodiments, each platform 32 may be connected to a respective support leg 28 by a platform connection 38, the platform 32 together with the platform connection 38 comprising a platform assembly 54. With reference to FIGS. 5, 7 and 9, in accordance with some embodiments, the platform connection 38 may comprise a pivot rod 40 about which the respective platform 32 pivots (i.e., so that the longitudinal platform axis A extends longitudinally through a center of the pivot rod 40, and thus lies between the support leg 28 and the platform 32).

The platform connection 38 may further comprise a biasing structure 42 to bias each of the respective platforms 32 toward a non-pivoted position (as shown in FIGS. 7, 8, 11, and 12). Biasing structure 42 may comprise one or more springs 44, or at least one pair of springs 44, which in an example embodiment, such as that shown in FIG. 9, may comprise at least one, or at least one pair, of torsion springs 44 with arm members 46 extending therefrom to contact an underside 48 of the respective platform 32 on opposite sides of the longitudinal platform axis A, so that the pivot rod 40 extends through a longitudinal axis of each of the torsion springs 44. The springs 44, such as the torsion springs shown in FIG. 9, may be fixedly attached to platforms 32 by known means, such as by welding, brackets, nuts and bolts, and any other suitable attachment mechanism. In some example embodiments, the platforms 32 may be fixedly attached to the respective torsion spring arm members 46 (e.g., by a welded connection, or other suitable mechanism as described above). In other embodiments, the springs 44 may comprise one or more compression springs, or one or more pairs of compression springs, such as four compression springs located on opposite sides of the longitudinal platform axis A in a manner that biases the platforms 32 to their non-pivoted positions. For example, each compression spring of each pair of compression springs may contact a respective underside 48 of a respective platform 32 on an opposite side of the longitudinal platform axis A than the other compression spring of the respective pair of compression springs.

Figure 11:
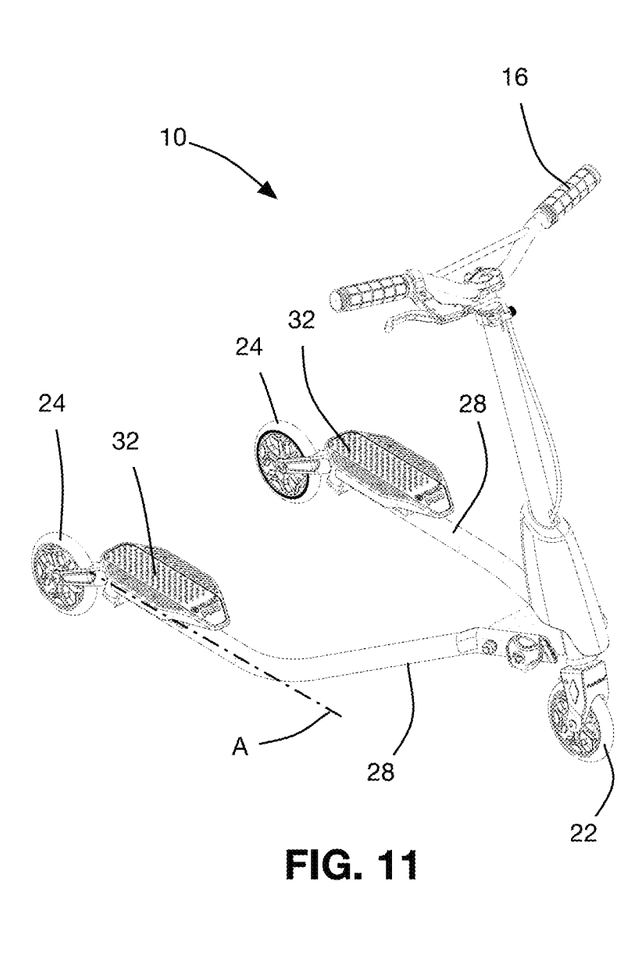
FIG. 11 is a top-right perspective view of another example swing scooter depicting another example platform assembly in a non-pivoted arrangement, according to non-limiting embodiments.
Figure 12:
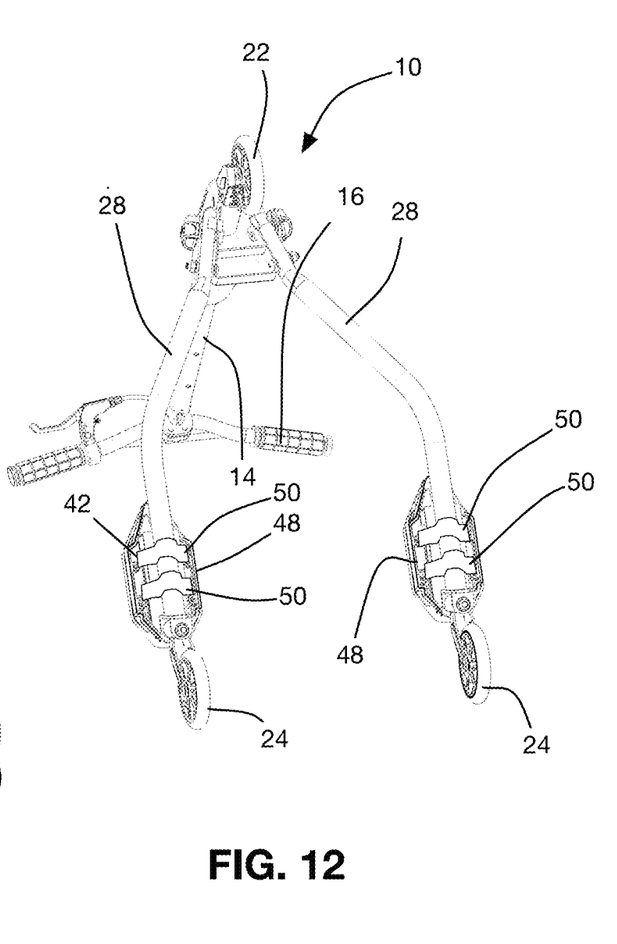
FIG. 12 is a lower-right perspective view of the swing scooter depicted in FIG. 9.

With reference to FIGS. 11 and 12, in accordance with some embodiments, the biasing structure 42 may comprise one or more biasing structure housings 50 extending around the respective support leg 28 and attaching to an underside 48 of the respective platform 32, on opposite sides of the respective support leg 28, such that the longitudinal platform axis A is coincident with the axis of the portion 34 of the respective support leg 28 around which the biasing structure housing 50 is attached. Each biasing structure housing 50 may comprise a rubber or polyurethane body formed around a plate (not shown) fixedly attached to the support leg 28 in a position that is parallel or substantially parallel to the non-pivoted position of the respective platform 32, such that the polyurethane body in contact with the plate resists pivoting of the respective platform 32 about the longitudinal platform axis A from the non-pivoted position to thereby effect a bias of the platform 32 toward the non-pivoted position.

It will be appreciated that longitudinal platform axis A may be oriented other than as described herein, the orientation depending on the configuration and type of platform connection 38 used to pivotally connect the platforms 32 to the support legs 28. For example, longitudinal platform axis A may extend longitudinally through a longitudinal center C of each platform 32, such as where the pivot rod 40 passes through the longitudinal center C of each platform 32.

In some embodiments, each platform 32 may comprise a textured upper surface 52 to increase friction with users' feet 98 so as to reduce the chance of slippage, which may further improve the efficiency of the transfer of force through a user's feet 98 to the support legs 28 via the platforms 32.

It is expected that the pivotable attachment of the at least one platform 32 to the support legs 28 may mitigate at least two problems. First, when a user's feet 98 apply force against the platforms 32 toward the right or left side as the user swings their body from side to side so as to propel the swing scooter 10, since the platforms 32 angle with the user's feet 98 as the user's feet 98 angle with respect to the surface S or plane H, any loss of contact between a portion of the user's feet 98 and the platforms 32, or lessening of the force applied to the platforms 32, which may result where the platforms are not pivotable, is expected to be lessened or eliminated and to thereby increase the efficiency of the transfer of force to the platforms 32 and, in turn, the propulsion of the swing scooter 10. Second, by avoiding an arrangement of the platforms that is horizontally fixed with respect to plane H, swing scooter 10 is expected to provide improved ergonomics since a user swinging their body side to side in order to propel the swing scooter 10 forward would be able to angle their feet 98, ankles and legs, while also angling the platforms 32, to apply outward force against the platforms 32, which is expected to place less or no strain on the user's ankles as compared to a scooter having platforms that are fixed horizontally with respect to plane H (where as the user attempts to maintain the soles of their feet 98 in the horizontal position (with respect to horizontal plane H) in order to attempt to maintain contact with the platforms as best as possible despite the side to side movement of their feet 98, the user's ankles may become strained).

Furthermore, in embodiments with the biasing structure 42, it is expected that the biasing structure 42, in providing a force that may oppose the pivoting force applied by a user's feet 98, may further improve the ability to maintain contact between the user's feet 98 and the platforms 32, which may in turn further improve the efficiency of force transfer from the user to the support legs 28 of the swing scooter 10, and thus improve the efficiency of propulsion of the swing scooter 10. Furthermore, since biasing structure 42 may bias each platform 32 to its non-pivoted position (as shown in FIGS. 7, 8, 11, and 12) when an external force sufficient to displace the platforms 32 from their non-pivoted positions is not applied by a user, biasing structure 42 is expected to facilitate boarding of the swing scooter 10 since the platforms 32 will be in their non-pivoted positions when at rest, ready to support the user's natural, horizontal (with respect to plane H) orientation when the swing scooter 10 is supported on support surface S.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. A swing scooter, comprising:
    a frame defining a longitudinal scooter axis;
    a steering member pivotally attached to the frame;
    a front wheel rotatably attached to a bottom end of the steering member, such that pivoting of the steering member causes the front wheel to pivot so as to steer the swing scooter;
    at least two support legs, each of the at least two support legs having a frame attachment end and a rear wheel end, and each of said at least two support legs being attached to the frame at the frame attachment end, wherein, at the rear wheel end of each of said at least two support legs, there is a rear wheel support pivotally attached thereto,
    a rear wheel rotatably attached to each rear wheel support; and
    at least two platforms, wherein each of the at least two platforms is movably attached to an associated one of the at least two support legs, and positioned for supporting a foot of a user of the swing scooter,
    wherein each of the at least two platforms has a longitudinal platform axis and is movable between a first position in which the platform is angled down laterally towards a first lateral side of the swing scooter, and a second position in which the platform is angled down laterally towards a second lateral side of the swing scooter, wherein the platform is movable to the first position and the second position by movement of the foot of the user.

2. The swing scooter of claim 1, wherein each of said at least two platforms is connected to said respective one of said support legs by a platform connection.

3. The swing scooter of claim 2 wherein the platform connection comprises a pivot rod about which the respective platform pivots, the longitudinal platform axis extending longitudinally through a center of the pivot rod.

4. The swing scooter of claim 3 wherein the platform connection further comprises a biasing structure for each of the at least two platforms, to bias each of the at least two platforms towards a respective non-pivoted position.

5. The swing scooter of claim 4 wherein the biasing structure comprises at least one spring.

6. The swing scooter of claim 5 wherein the at least one spring comprises at least one pair of torsion springs with arm members extending therefrom to contact an underside of the respective platform on opposite sides of the longitudinal platform axis, the pivot rod extending through a longitudinal axis of each of the at least one pair of torsion springs.

7. The swing scooter of claim 6 wherein each of said platforms is fixedly attached to the respective torsion spring arm members.

8. The swing scooter of claim 2 wherein each said platform connection comprises a biasing structure to bias each of the respective platforms toward a non-pivoted position.

9. The swing scooter of claim 8 wherein each said biasing structure comprises at least one spring.

10. The swing scooter of claim 9 wherein each said biasing structure comprises at least one pair of compression springs, each compression spring of the respective at least one pair of compression springs contacting an underside of the respective platform on an opposite side of the longitudinal platform axis than the other compression spring of the respective at least one pair of compression springs.

11. The swing scooter of claim 8 wherein each said biasing structure comprises at least one pair of compression springs, each compression spring of the respective at least one pair of compression springs contacting an underside of the respective platform on an opposite side of the longitudinal platform axis than the other compression spring of the respective at least one pair of compression springs.

12. The swing scooter of claim 8 wherein each said biasing structure comprises one or more biasing structure housings extending around the respective support leg and attaching to an underside of the respective platform on opposite sides of the respective support leg, such that the longitudinal platform axis comprises the axis of the portion of the respective support leg around which the housing is attached;

wherein each said housing comprises a polyurethane body formed around a plate fixedly attached to the support leg in a position that is parallel or substantially parallel to the non-pivoted position of the respective platform, the polyurethane body in contact with the respective plate resisting pivoting of the respective platform about the longitudinal platform axis from the non-pivoted position to thereby effect said bias of the respective platform toward the non-pivoted position.

13. The swing scooter of claim 1 wherein, for each of said at least two platforms, the longitudinal platform axis is between the respective one of said support legs and the respective platform.

\* \* \* \* \*